(No Model.) 4 Sheets—Sheet 3.
G. W. C. LOMB.
VEHICLE WHEEL.
No. 591,771. Patented Oct. 12, 1897.
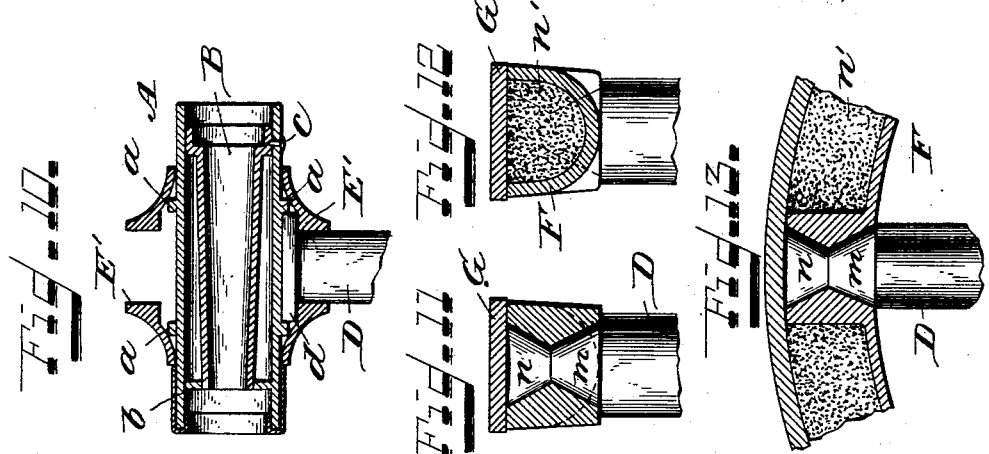
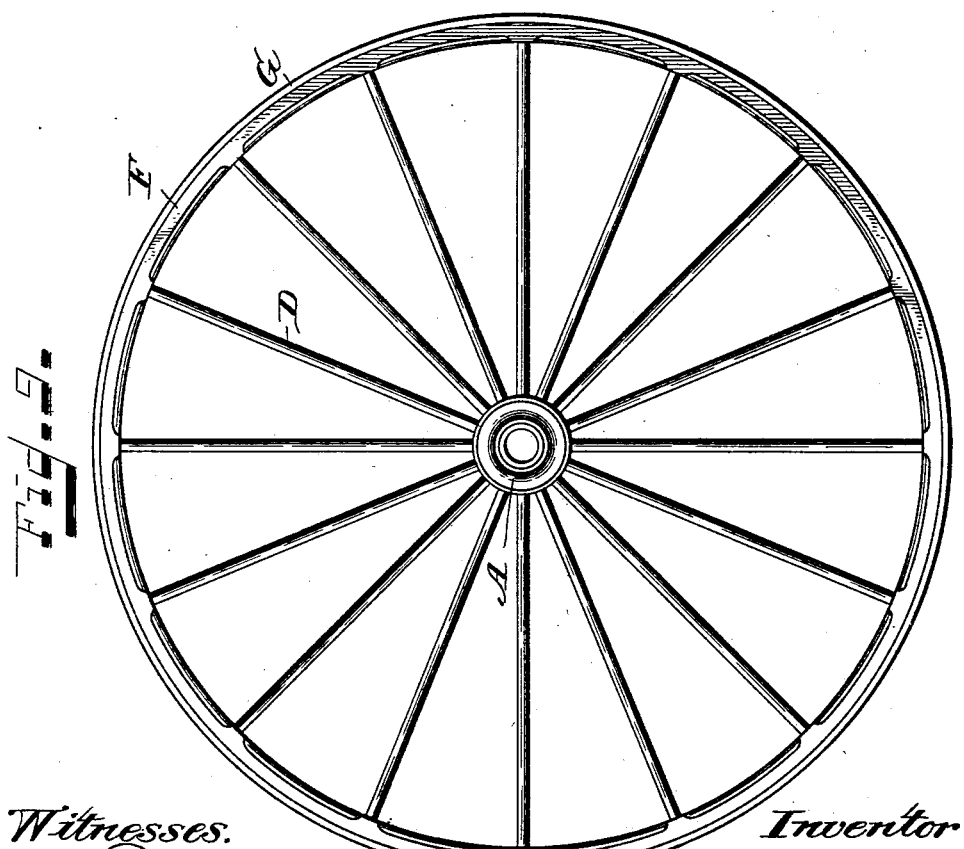
Witnesses.
J. Thomson Cross
Harvey Edwards
Inventor
George W. C. Lomb
by Alfred M. Allen
Attorney.

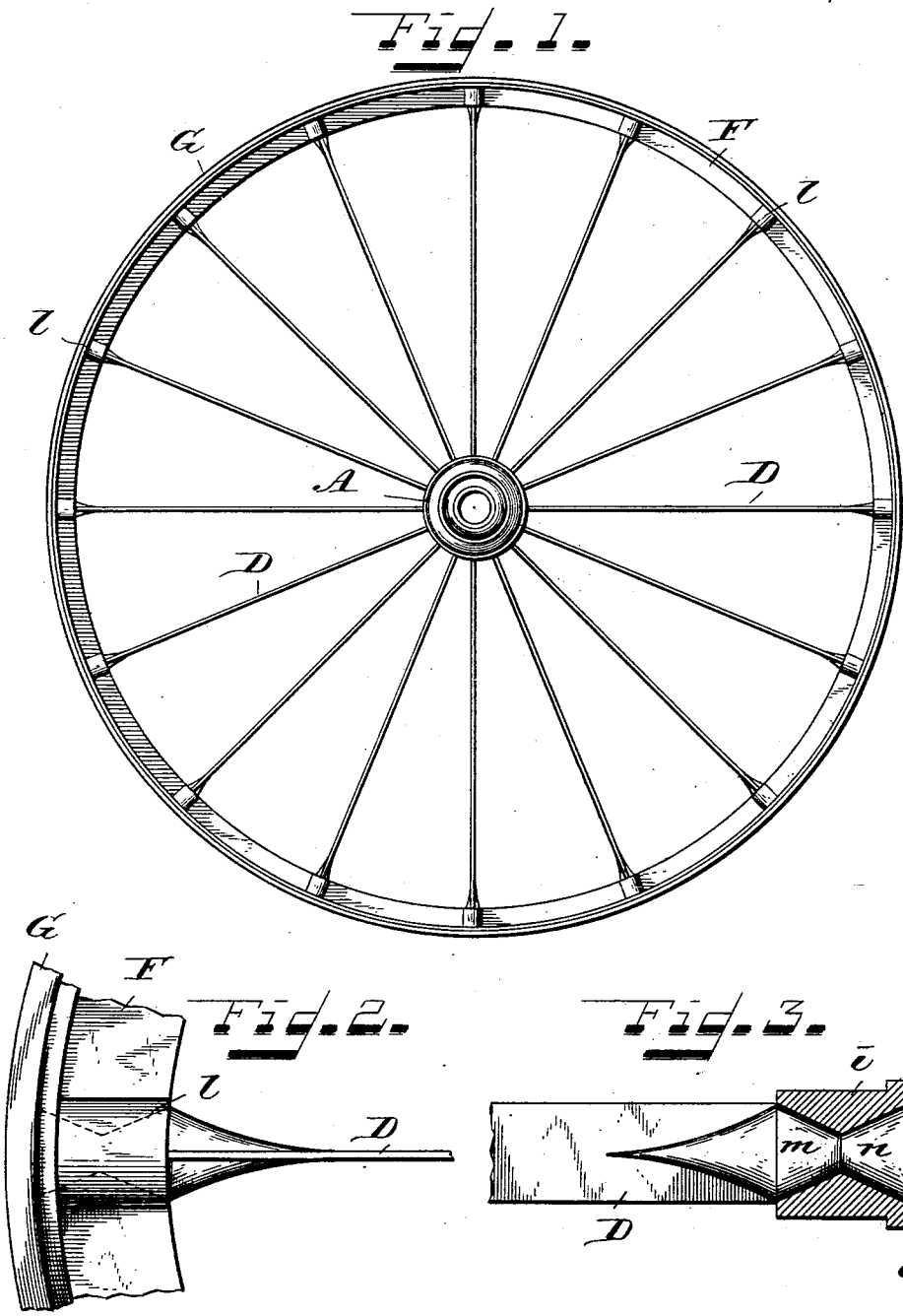

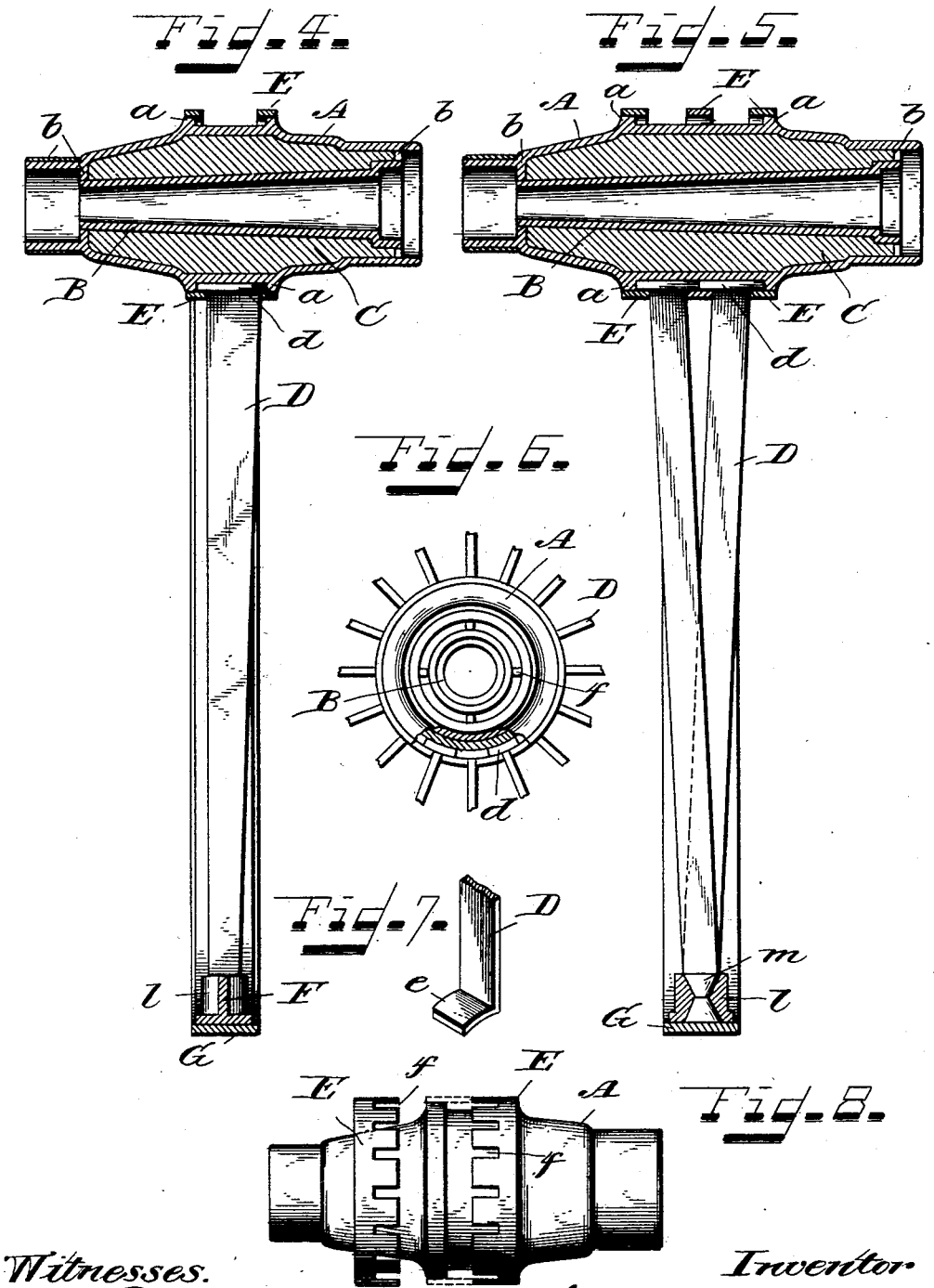

(No Model.) 4 Sheets—Sheet 4.
G. W. C. LOMB.
VEHICLE WHEEL.
No. 591,771. Patented Oct. 12, 1897.
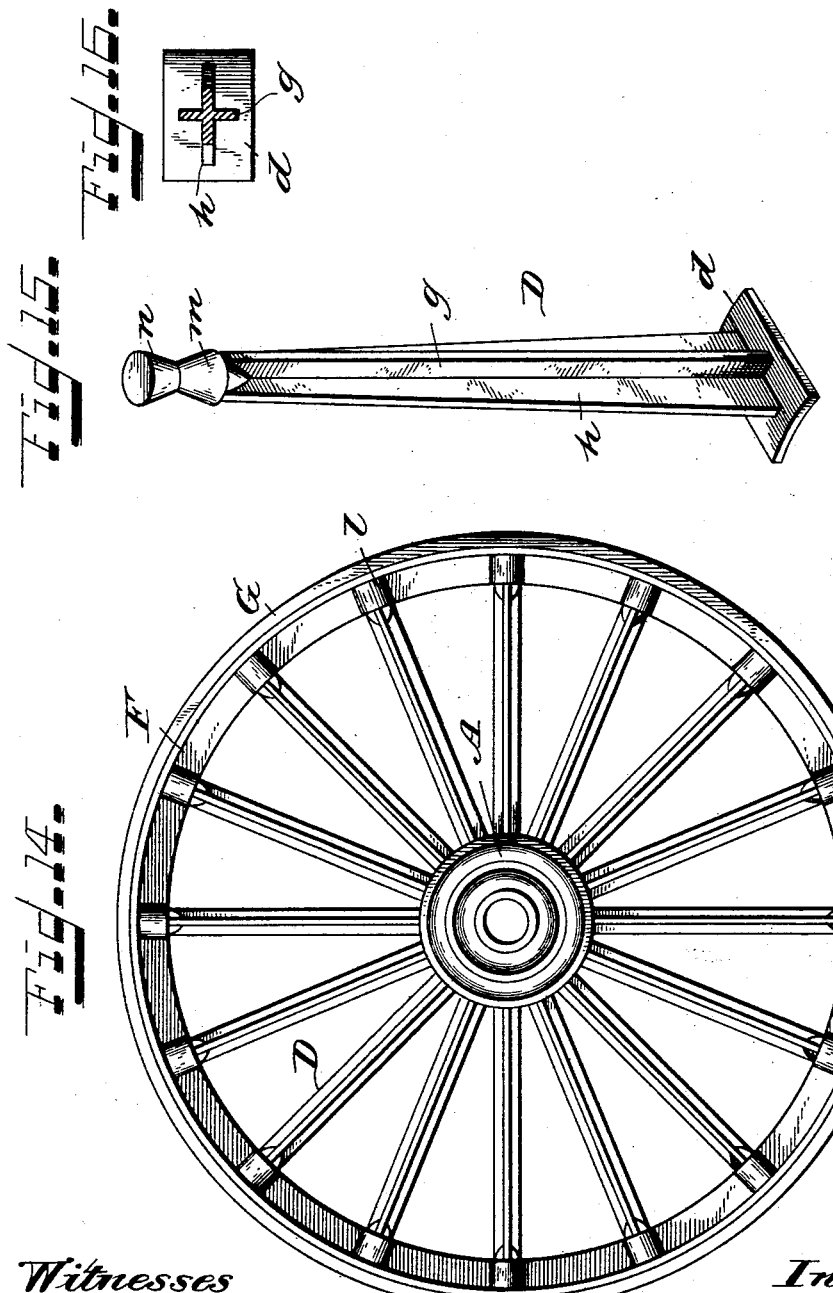
Witnesses
J. Thomson Cross
Harvey Edwards
Inventor:
George W. C. Lomb
by Alfred M. Allen
Attorney.

UNITED STATES PATENT OFFICE.

GEORGE W. C. LOMB, OF BIRMINGHAM, ALABAMA, ASSIGNOR OF ONE-HALF TO WILLIAM S. LOCKE AND GRENVILLE W. WERDEN, OF CINCINNATI, OHIO.

VEHICLE-WHEEL.

SPECIFICATION forming part of Letters Patent No. 591,771, dated October 12, 1897.

Application filed April 18, 1896. Serial No. 588,194. (No model.)

*To all whom it may concern:*

Be it known that I, GEORGE W. C. LOMB, a citizen of the United States, residing at Birmingham, in the county of Jefferson and State of Alabama, have invented certain new and useful Improvements in Vehicle-Wheels, of which the following is a full, clear, and exact description, reference being had to the accompanying drawings, forming part of this specification.

My invention relates to improvements in wheels for vehicles, and has particular reference to vehicle-wheels in which metallic hubs, spokes, and fellies are employed.

Heretofore when it has been sought to construct a metallic vehicle-wheel it has been customary to construct the hub in two or more parts riveted or held together by bolts and nuts and to secure the spokes thereto by rivets or bolts. Such wheels have not met with commercial success for the reason mainly that no matter how securely the parts are riveted or bolted the jars and rough usage to which the wheels must necessarily be subjected on paved streets and rough country roads soon loosen the rivets and one or more spokes become loose, rendering the wheel short lived and the rattle and noise unbearable. Then, too, such metallic wheels as ordinarily constructed are far too rigid and lack elasticity. The jars and strains to which the wheels are subjected are thus transferred directly to the vehicle, and thus the wheels lack the qualities which greatly assist in making easy riding and running conveyance.

It is the purpose of my invention to avoid these objections to metallic wheels as heretofore constructed. I do this in the main by the construction of a wheel partly suspended and partly rigid, in which the weight is in part at least suspended from the wheel-felly, so that the requisite elasticity may be obtained. I also form my hub of a single metallic shell, and the spokes are secured to the hub not by rivets or bolts, but by seamless metallic bands shrunk or pressed on the hub over shoulders on the spokes, so that there is no liability of the spokes ever becoming loose or rattling in the hub.

There are various other points of novelty of construction and operation which will be hereinafter pointed out and claimed.

In the drawings, Figure 1 is a front elevation of my improved wheel. Fig. 2 is a detail view of a portion of the felly and outer end of a spoke. Fig. 3 is a cross-section of same with spoke in full lines. Fig. 4 is a central section of a portion of the hub and wheel, showing the spokes in line. Fig. 5 is a similar section with the spokes staggered. Fig. 6 is a front view of the hub, partly in section. Fig. 7 is a perspective view of the inner end of a modified form of spoke. Fig. 8 is a side view of the hub, showing a modified form of band. Fig. 9 is a front elevation of my improved wheel, showing cylindrical spokes. Fig. 10 is a central longitudinal section of a modified form of hub. Figs. 11, 12, and 13 are sectional views showing modifications of the felly. Fig. 14 is a front elevation of a heavier class of wheel with a modified form of spoke. Fig. 15 is a perspective view of one of the spokes of the wheel shown in Fig. 14. Fig. 16 is a cross-section of same.

A is the hub, consisting of a seamless metallic shell and provided with shoulders *a a*, against which the shoulders on the spokes abut, as will be hereinafter described.

B is the journal-box, centered in the hub by the lugs or rim *b b* at front and rear and sometimes embedded in brimstone, plaster-of-paris, or other cement C, which is filled in around the journal to form a solid support for the journal-box. Sometimes, however, no central filling is employed, as shown in Fig. 10, and in that event the journal-box is centered in the lugs and held from turning in the hub by pin *c* or otherwise.

The spokes D D are of various shapes in cross-section, depending on the character of wheel desired, and they may be either staggered, as shown in Fig. 5, or arranged in single line, as shown in Fig. 4.

One of the preferred forms of spokes is a flat metallic bar having integral therewith at the inner end a flange *d*. In the form of wheel shown in Fig. 4 this flange is of such size as to fit snugly between the shoulders *a a* on the hub, and the side edges of each spoke abut against each other around the hub. When the spokes are staggered, as shown in Fig. 5, the inner ends of the flanges of each set of spokes abut against each other and the outer edges against the shoulders on the hub.

For securing the spokes to the hub I employ seamless metallic bands E E. These bands are shrunk or pressed on the hub over the ends of the flanges on the spokes, and when properly shrunk or pressed they hold the spokes rigidly to the hub without any danger of their working loose. When the spokes are staggered, as shown in Fig. 5, three of these bands are used, one series of spokes being set in place and the inner band then being shrunk on. For the various kinds of spokes I use bands to correspond, so that the spokes can be rigidly held no matter what the shape.

For some kinds of wheel I use a spoke such as is shown in Fig. 7, with a single flange or shoulder $e$. These spokes are set around the hub with the front edge of each spoke abutting against the rear edge of the next spoke, and in order that these spokes may be held in place I form slots $ff$ in the bands, so that the bands may be set in between the spokes and the inner edges of the bands will abut, the spokes passing out between the slots.

For the spokes oval or cylindrical in cross-section, as shown in Figs. 9 to 13, the flange on the inner end of the spoke is somewhat thicker than the depth of the groove formed by the shoulders $a\ a$, and for this class of spoke I use bands D D of the shape shown in cross-section, Fig. 10.

For the heavy express-wheel, such as is shown in Fig. 14, I use a spoke +-shaped in cross-section, one bar $g$ of which is preferably of the same width throughout, while the other bar $h$ is preferably narrower at the outer end and slopes out gradually to the base. The band D used for this kind of spoke will necessarily be of the general character shown in Fig. 8.

I do not, of course, wish to be limited to any of the particular shapes of spokes and of bands shown, as they are all modifications of the same general plan, and, doubtless, many other shapes will readily suggest themselves.

F is the felly of the wheel, preferably comprising a T-band, with enlarged boxes or bushings $l$ to receive the outer ends of the spokes. The boxes $l$ are formed with a double-cone-shaped opening, and the outer ends of the spokes are formed with a cone-shaped portion $m$ to fit the inner cone-shaped recess and a cylindrical outer portion $n$, and when the spokes are inserted in the felly these cylindrical portions are upset, so as to fill out the outer cone-shaped recess, and thus the spokes are securely fastened to the felly. Instead of a T-band felly, however, I also use a semicylindrical felly, such as is shown in Figs. 11 and 13, in which the central portion of the felly $n$ is filled with plaster, cement, wood fiber, or the like, and the tire G incloses the filling. With this form of felly the same boxes $l$ and method of securing the spokes are employed as with the T-band fellies.

While I show two forms of felly, I do not wish to be limited to the forms shown, as many other shapes can readily be suggested without in any way departing from my invention.

With the wheel made in any of the ways suggested, which, it will be evident, are all of the same general plan, it will be seen that the spokes are all secured to the hub without bolts or rivets and that the pressure of the bands will hold the spokes securely without any liability of working loose.

Having described my invention, what I claim, and desire to secure by Letters Patent, is—

1. In a vehicle-wheel, the combination, with a hub, of metallic spokes provided with flanges at their inner ends arranged to come within the side edges of the spokes with metallic retaining-bands slotted to receive the side edges of the spokes and allow the bands to embrace said flanges, substantially as shown and described.

2. In a vehicle-wheel, the combination, with a metallic hub provided with shoulders or rims to form a recess around the center of the hub, of a metallic felly provided with enlargements, having cone-shaped recesses therein, metallic spokes having flanges at their inner ends and bands for securing same to the hub between said shoulders, said spokes being cut away at the outer ends and upset within said recesses to secure same to the felly, substantially as shown and described.

3. In a vehicle-wheel, the combination, with a seamless metallic shell to form the hub, of metallic spokes having flanges at their inner ends and metallic bands fitting over said flanges to secure said spokes to the external surface of the shell, axle-box centered on lugs at each end of the hub-shell, and a brimstone, cement or wood-fiber filling between the axle-box and the internal surface of the shell, substantially as shown and described.

4. In a vehicle-wheel, the combination, with a metallic hub, provided with shoulders or rims to form a recess around the center of the hub, of metallic spokes provided with single flanges of same width as the spokes to fit between said rims and abut against the next spokes with metallic retaining-bands slotted to receive the side edges of the spokes and allow the bands to meet between the spokes, substantially as shown and described.

GEORGE W. C. LOMB.

Witnesses:
GEORGE HEIDMAN,
HARVEY EDWARDS.